(12) United States Patent
Short et al.

(10) Patent No.: US 7,362,849 B2
(45) Date of Patent: Apr. 22, 2008

(54) 2D COLLIMATOR AND DETECTOR SYSTEM EMPLOYING A 2D COLLIMATOR

(75) Inventors: Jonathan Short, Saratoga Springs, NY (US); Martin Lee, Niskayuna, NY (US); J. Eric Tkaczyk, Delanson, NY (US); David Hoffman, New Berlin, WI (US); Brian David Yanoff, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 11/325,023

(22) Filed: Jan. 4, 2006

(65) Prior Publication Data

US 2007/0152159 A1   Jul. 5, 2007

(51) Int. Cl.
*G21K 1/02* (2006.01)
(52) U.S. Cl. ............ 378/154; 378/7; 378/149
(58) Field of Classification Search ........ 378/7, 378/149, 154
See application file for complete search history.

(56) References Cited

U.S. PATENT DOCUMENTS

| 2,133,385 | A | * | 10/1938 | Freeman ............... 378/154 |
| 2,512,242 | A | * | 6/1950 | De Lassu Genies ...... 378/41 |
| 4,951,305 | A | * | 8/1990 | Moore et al. .......... 378/147 |
| 5,455,849 | A | * | 10/1995 | Logan et al. .......... 378/154 |
| 5,799,057 | A | * | 8/1998 | Hoffman et al. ......... 378/147 |
| 5,949,850 | A | * | 9/1999 | Tang ................. 378/154 |
| 6,134,301 | A | * | 10/2000 | Mruzek et al. ......... 378/147 |
| 6,175,615 | B1 | * | 1/2001 | Guru et al. ........... 378/149 |
| 6,363,136 | B1 | * | 3/2002 | Flisikowski et al. ..... 378/154 |
| 6,470,072 | B1 | * | 10/2002 | Johnson .............. 378/154 |
| 6,594,878 | B2 | * | 7/2003 | Kohda ................ 29/417 |
| 2003/0128812 | A1 | | 7/2003 | Appleby et al. ....... 378/147 |
| 2005/0135563 | A1 | | 6/2005 | Hoffman ............. 378/154 |

* cited by examiner

*Primary Examiner*—Edward J. Glick
*Assistant Examiner*—Thomas R. Artman
(74) *Attorney, Agent, or Firm*—Fletcher Yoder (57) ABSTRACT

A two dimensional (2D) collimator assembly and a detector system employing a 2D collimator assembly. More specifically, a collimator assembly is provided, having elements extending in the x and z-planes of a detector system. The 2D collimator assembly includes a number of blades arranged in parallel. Each of the blades includes fins extending from one or both sides of the body of the blade. The fins are coupled to each adjacent array to form the 2D collimator assembly.

27 Claims, 5 Drawing Sheets

2D COLLIMATOR AND DETECTOR SYSTEM EMPLOYING A 2D COLLIMATOR

BACKGROUND

The present invention relates generally to a detector system, and, more particularly to a two dimensional (2D) collimator assembly which may be employed in a detector system.

Computed tomography (CT) is utilized for a wide variety of imaging applications, such as medical imaging. CT systems are imaging systems that are generally configured to transmit x-rays through a structure, such as a human body, to detect and diagnose abnormalities, such as tumors. These low energy x-rays are subsequently received and processed to formulate an image, often three-dimensional, of the body structure that can by analyzed by clinicians as a diagnostic aid.

The reception of the radiation, such as gamma rays or x-rays, is often accomplished through the use of a device such as a detector assembly. The detector assembly is typically comprised of a plurality of structures working together to receive and process the incoming energy rays after they have passed through the body structure. The detector assembly utilizes a scintillator assembly to convert incident radiation, such as x-rays, into light for detection at an array of light detection devices. Scintillation allows the radiation received by the scintillator assembly to be converted into useful information. Scintillator assemblies may come in a wide variety of forms and may be adapted to receive a wide variety of incoming rays. The light produced by the scintillator assembly is commonly received (or "detected") and processed by a detection device such as a light sensitive photodiode, which converts the light from the scintillator assembly into an electronic signal. The information from the scintillator assembly can be easily transferred, converted, and processed by electronic modules in a data acquisition system to facilitate viewing and manipulation by clinicians.

Typically, detector assemblies also include a collimator assembly. A collimator assembly is typically designed to reduce x-ray scatter and/or shield the underlying elements from undesirable exposure. The collimator assembly is used to reduce x-ray scatter as the x-rays approach the scintillator element. Scattered photons can cause excess noise and artifacts in the reconstructed CT images. In addition, the collimator is commonly used as a shielding device for shielding the edges of the individual scintillator cells and to prevent x-rays from impinging on the edges of the scintillators causing non linearities and image artifacts. The collimator may also be employed to prevent x-rays from damaging the reflector between scintillator elements, to prevent x-rays from being transmitted through the gap between scintillator elements and impinging on the photo diode causing noise and/or to prevent x-rays from being transmitted through the gap between scintillator elements and impinging on electronics located behind the detector causing damage to these sensitive electronic components. Thus, present collimator assembly designs commonly attempt to balance shielding and scatter reducing properties.

Currently, CT collimator assemblies are 1-dimensional (1D) arrays assembled from long, thin metal blades, such as tungsten blades. In conventional systems these blades are >75 mm long, 200 um thick, and 7-8 mm tall. Approximately 1000 of these blades are assembled onto a precisely machined support rail to create a complete collimator assembly. While useful for scatter reduction and shielding, typical 1D collimator assemblies have a number of disadvantages. The assembly process is often tedious, and the cost of assembly is a significant fraction of the total cost of the collimator. In addition, at high gantry rotation rates, the tungsten blades deflect and cast shadows onto part of each detector pixel, causing gain-error artifacts in the image. Further, current collimator assembly designs are not easily extended to wider detectors (more slices) because of the mechanical stability of the blades. As desired detection areas grow, this shortcoming becomes an increasingly significant obstacle. Still further, the total amount of scatter impinging on the collimator increases roughly in proportion to the z-coverage of the detector. At the coverage that will soon be desired, the ability of the 1D collimator to reject the incoming scatter becomes increasingly inadequate.

Therefore, there is currently a need for a collimator assembly that provides for wider scanning areas, improved structural durability and simpler fabrication techniques.

BRIEF DESCRIPTION

In accordance with exemplary embodiments of the present invention, there is provided a collimator assembly. The collimator assembly comprises a plurality of blades arranged in parallel with respect to one another, wherein each of the plurality of blades comprises a body and a respective plurality of fins coupled to the blade and extending therefrom, and wherein each of the respective plurality of fins is coupled to an adjacent one of the plurality of blades.

In accordance with further exemplary embodiments of the present invention, there is provided a collimator assembly comprising a first blade and a second blade. The first blade has a first plurality of fins extending therefrom. The second blade is arranged in parallel to the first blade and having a second plurality of fins extending therefrom.

In accordance with another exemplary embodiment of the present invention, there is provided an imaging detector assembly. The imaging detector assembly comprises a detector array. The imaging detector array further comprises a scintillator assembly configured to receive incident radiation and configured to convert the incident radiation to light for transmission to the detector array. The imaging detector array further comprises a collimator assembly comprising a plurality of blades arranged in parallel with respect to one another, wherein each of the plurality of blades comprises a respective plurality of fins coupled to the blade and extending therefrom, and wherein each of the respective plurality of fins is coupled to an adjacent one of the plurality of blades.

In accordance with still another exemplary embodiment of the present invention, there is provided a method of fabricating a collimator assembly. The method comprises forming a plurality of blades, wherein each of the plurality of blades comprises a respective plurality of fins extending therefrom, and coupling each of the respective plurality of fins to an adjacent one of the plurality of blades.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
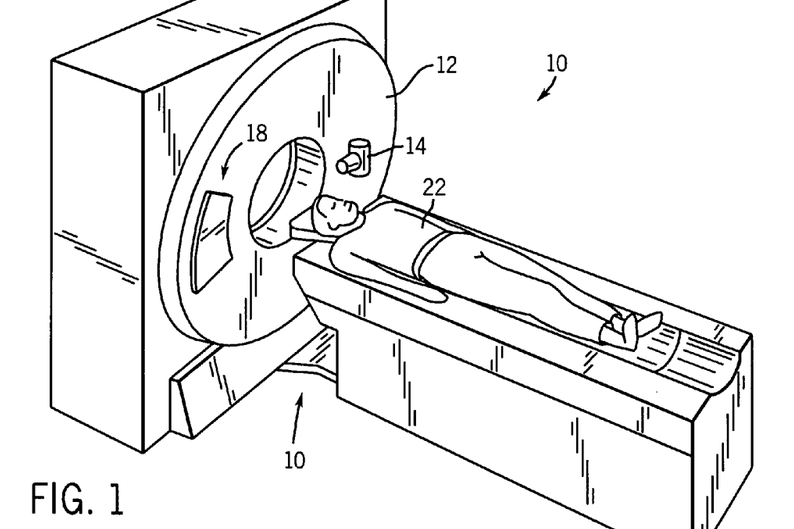
FIG. 1 is an illustration of a computed tomography imaging system which may include a collimator assembly in accordance with embodiments of the present invention.
Figure 2:
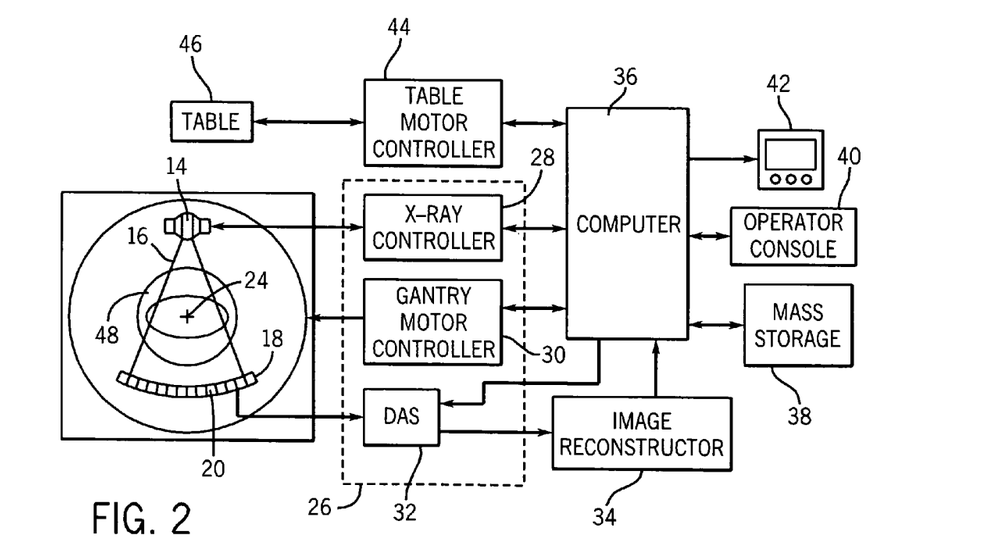
FIG. 2 is a block diagram of the imaging system illustrated in FIG. 1 in accordance with embodiments of the present invention.

Referring now to FIGS. 1 and 2, a computed tomography (CT) imaging system 10 which may employ a detector assembly 18 which may be configured in accordance with embodiments of the present invention is illustrated. As used herein, "adapted to," "configured to," and the like refer to elements that are sized, arranged or manufactured to form a specified structure or to achieve a specified result. Although a particular CT imaging system 10 has been illustrated, it should be understood that the detector assembly 18 of the present invention may be utilized in a wide variety of imaging systems.

The CT imaging system 10 includes a scanner assembly 12 illustrated as a gantry assembly. The scanner assembly 12 includes an x-ray source 14 for projecting a beam of x-rays 16 toward the detector assembly 18 positioned opposite the x-ray source 14. The detector assembly 18 includes a plurality of detector elements arranged to form a detector array 20, which is configured to sense the projected x-rays 16 that pass through an object, such as a medical patient 22. As will be appreciated, the patient 22 is typically said to be positioned along the Z-axis. Each of the plurality of detector elements in the detector array 20 produces an electrical signal that represents the intensity of an impinging x-ray beam and hence the attenuation of the beam 16 as it passes through the patient 22. Commonly, during a scan to acquire x-ray projection data, the scanner assembly 12 is rotated about the center of rotation 24. In one embodiment, illustrated in FIG. 2, detector elements of the detector array 20 are arranged in one row such that projection data corresponding to a single image slice is acquired during a scan. In other embodiments, the detector elements of the detector array 20 can be arranged in a plurality of parallel rows, such that projection data corresponding to a plurality of parallel slices can be acquired simultaneously during a scan.

The rotation of the scanner assembly 12 and the operation of the x-ray source 14 are preferably governed by a control mechanism 26. The control mechanism 26 preferably includes an x-ray controller 28 that provides power and timing signals to the x-ray source 14 and a scanner motor controller 30 that controls the rotational speed and position of the scanner assembly 12. A data acquisition system (DAS) 32 in control mechanism 26 samples analog data from the detector array 20, commonly a photodetector array, and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

The computer 36 may also receive commands and scanning parameters from an operator via an operator console 40 that has a keyboard or similar input device. An associated display 42 allows the operator to observe the reconstructed image and other data from the computer 36. The operator supplied commands and parameters are used by computer 36 to provide control signals and information to the DAS 32, x-ray controller 28, and scanner motor controller 30. In addition, the computer 36 operates a table motor controller 44 which controls a motorized table 46 to position the patient 22 within the scanner assembly 12. Particularly, the table 46 moves portions of the patient 22 through the scanner opening 48.

Figure 3:
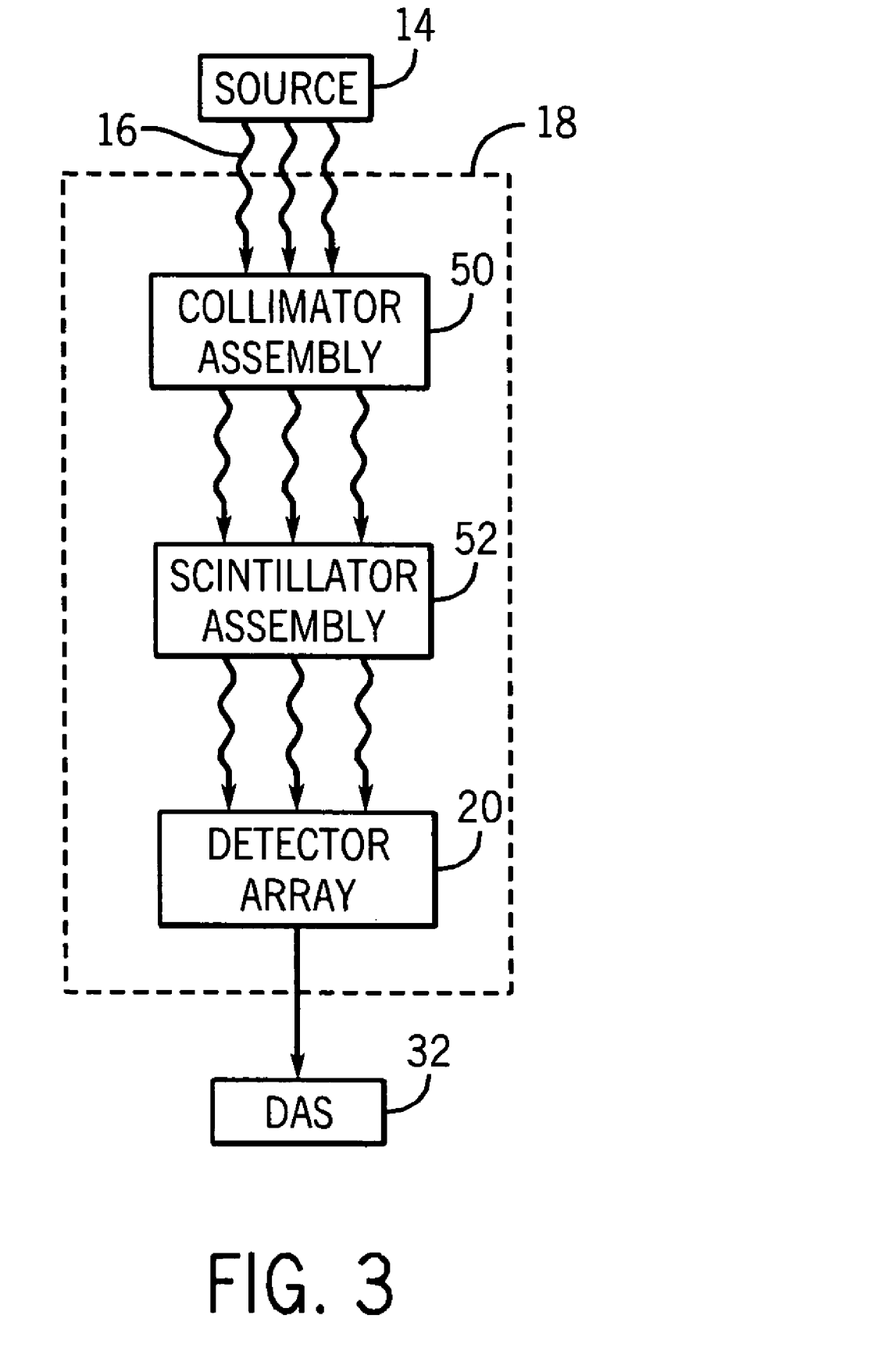
FIG. 3 is a simplified block diagram of the imaging detector assembly of FIG. 2 in accordance with embodiments of the present invention.

Referring now to FIG. 3, a block diagram of the detector assembly 18 which may be configured in accordance with embodiments of the present invention is illustrated. As previously described, the detector assembly 18 receives x-rays 16 from a source 14 and transmits analog data to the DAS 32. The detector assembly 18 includes a collimator assembly 50, a scintillator assembly 52 and a detector array 20. During operation, x-rays 16 pass through an object such as a patient 22, then through the openings in the collimator assembly 18, and are subsequently received by the detector array 20. As will be described further below with reference to FIGS. 4-9, the collimator assembly 50 is generally configured to limit and define the direction and angular divergence of the x-rays 16 onto the scintillator assembly 52. In accordance with embodiments of the present invention, the collimator assembly 50 comprises a two dimensional collimator made of radiation absorbent material such as lead or tungsten, for example. The x-rays 16 are directed through the collimator assembly 50 to the scintillator assembly 52. The scintillator assembly 52 is configured to convert the incident x-rays into light for detection by the underlying detector array 20. The detector array 20 generally comprises a number of photo detectors, such as photodiodes. The photodiodes in the detector array 20 sense the incident light rays from the scintillator assembly 52 and convert the light rays into analog signals which are then transmitted to the DAS 32 which converts the analog data to digital signals for subsequent processing, as previously described.

Figure 4:
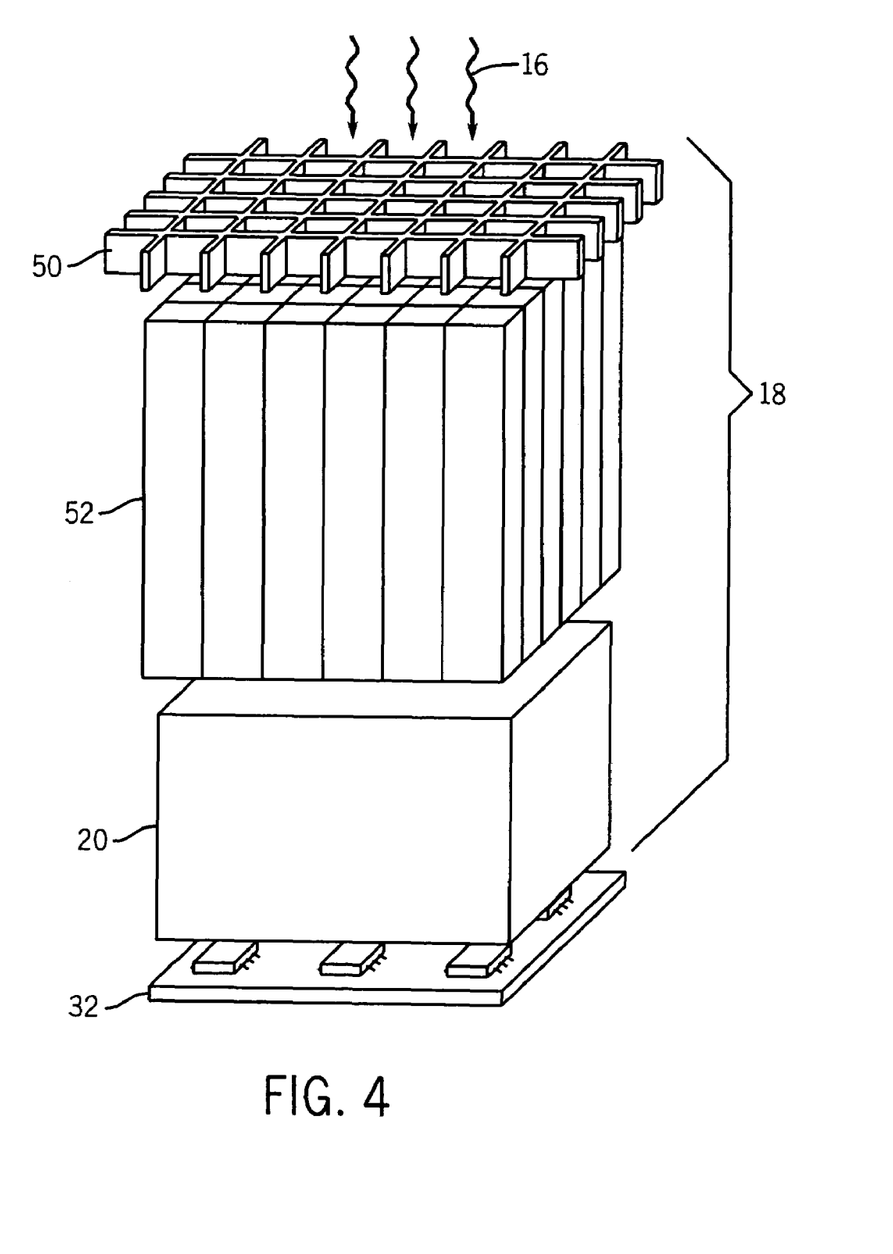
FIG. 4 is a perspective view of the imaging detector assembly of FIG. 3 in accordance with embodiments of the present invention.

FIG. 4 illustrates a detector assembly 18 fabricated in accordance with embodiments of the present invention. As previously described with respect to FIG. 3, the detector assembly 18 includes a collimator assembly 50, a scintillator assembly 52, and a detector array 20. In accordance with embodiments of the present invention, the exemplary collimator assembly 50 comprises a 2D structure. As will be described further below with reference to FIGS. 5-9, the 2D collimator 50 includes a plurality of blades which are oriented in the z-direction of the CT imaging system 10. Each of the blades includes a number of fins which extend from the blades in the x-direction of the CT imaging system 10. As will be appreciated, the fins provide scatter rejection for x-rays in the z-direction. Using a process such a molding, etching, laser cutting, EDM, wire-saw, or electroforming, for example, each of the blades may be produced having fins extending from one or more surfaces of the body of the blade. The blades can then be arranged in parallel and the fins of one blade can be coupled directly to an adjacent blade to form the 2D collimator assembly 50 illustrated in FIG. 4. In one exemplary embodiment, the fins of each blade are coupled directly to the fins of the adjacent blade.

Advantageously, the 2D collimator assembly 50 illustrated in FIG. 4 and described further below with reference to FIGS. 5-9, provides high scatter rejection and provides additional mechanical stability to the collimator assembly 50 when compared to traditional 1D collimator assemblies, which may facilitate the extension of the collimator assembly 50 for use in wider detectors configured to cover larger areas. By providing collimation in both the x- and z-planes, scattered versus primary x-rays (SPR) can be better controlled. The exemplary 2D collimator assembly 50 also enables higher rotational speed detectors by increasing the mechanical rigidity when compared to conventional 1D designs. As will be further described below, embodiments of the present invention also provide a highly producible and easily manufactured collimator assembly 50 which may be easily manufactured through etching, EDM, laser cut or other suitable methods. Advantageously, the 2D collimator assembly 50 also allows for enhanced producibility by minimizing the warpage in molding due to the smaller aspect ratio of the present design. The combination of the scatter rejection of the 2D collimator assembly 50 with the mechanical alignment/structure of the individually produced blades with tight tolerance provides a collimator assembly 50 that enables wide-coverage, high rotation speeds, increased manufacturing tolerances of molded pieces for producibility, and greater field-repairability, due to the modularity of the collimator assembly 50 and of the overall detector assembly 18, in general. The accurate alignment of the individual blades to produce the collimator assembly 50 also provides improved dose utilization of the overall detector assembly 18.

Figure 5:
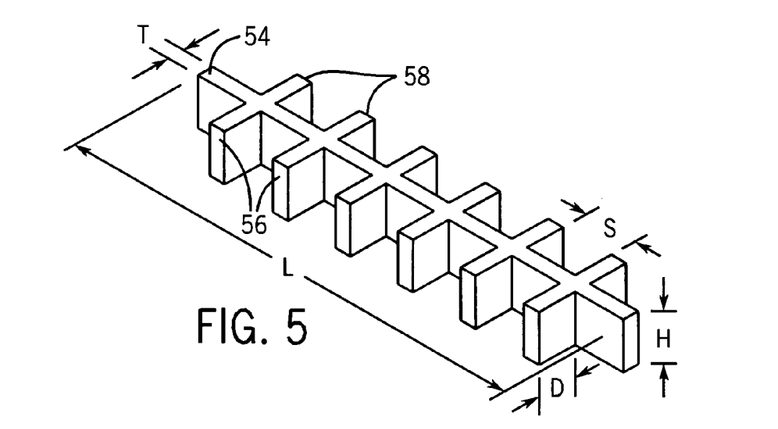
FIG. 5 is a perspective view of a portion of the collimator assembly of FIG. 4, in accordance with one exemplary embodiment of the present invention.

Referring now to FIG. 5, an exemplary blade 54 in accordance with one embodiment of the present invention is illustrated. The blade 54 may be made of any radiation absorbent material such a lead or tungsten. The blade 54 may have a length L greater than 75 mm, for example. The thickness T of the blade 54 is generally in a range of 100-200 microns, for example. The height H of the blade 54 is generally in the range of about 5 mm and 30 mm, for example. As previously described, in accordance with embodiments of the present invention, each of the individual blades, such as the blade 54, of the collimator assembly 50 includes a plurality of fins extending therefrom. For example, the blade 54 may include fins 56 extending from a first side of the blade 54 and similarly arranged fins 58 extending from a second side of the blade 54. The fins 56 and 58 generally comprise the same thickness T and height H as the blade 54. Alternatively, the thickness of the fins 56 and 58 may be less than the thickness T of the blade 54. Each of the fins 56 and 58 may extend from the surface of the blade 54 to a distance D in the range of about 0.4 mm to 1.5 mm. Further, the spacing S between each of the fins 56 and 58 may be in the range of approximately 0.4 mm to 3.0 mm. In one exemplary embodiment, the aspect ratio of the fins 56 and 58 (D/T) is approximately 5:1. Further, in one exemplary embodiment, the H/T ratio is approximately 80:1.

In one exemplary embodiment, the blade 54 and the fins 56 and 58 comprise a solid piece material. That is, the blade 54 is fabricated as a solid piece having fins 56 and 58 extending therefrom. For instance, the blade 54 having fins 56 and 58 extending therefrom in one solid piece may be formed by employing a molding process, for example. Alternatively, the center portion of the blade 54 may be fabricated as a single piece and each of the fins 56 and 58 may be later attached thereto using a glue or epoxy, for example. The fins 56 and 58 may comprise the same material as the body of the blade 54. Alternatively, the fins 56 and 58 may comprise a different material than the body of the blade 54. In one exemplary embodiment, the fins 56 and 58 comprise a polymer material loaded with a high atomic number material, such as tungsten power, for instance.

Figure 6:
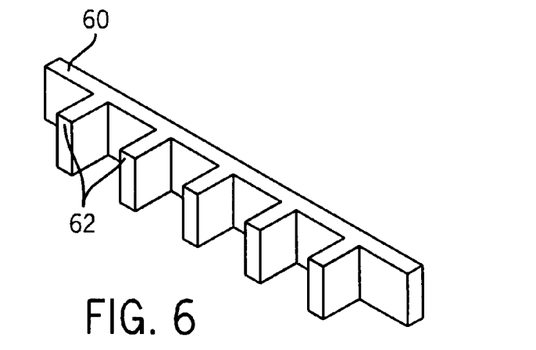
FIG. 6 is a perspective view of a portion of the collimator assembly of FIG. 4, in accordance with another exemplary embodiment of the present invention.

FIG. 6 illustrates an alternative exemplary embodiment of an individual blade 60 which may be employed to form the 2D collimator assembly 50 of the present invention. The blade 60 includes fins 62 extending only from one side of the blade 60. In the embodiment illustrated in FIG. 6, the fins 62 of the blade 60 may extend a greater distance D from the blade 60 when compared to the fins 56 and 58 of the blade 54 illustrated in FIG. 5. In one exemplary embodiment, the fins 62 extend a distance D in the range of about 0.8 mm to 3.0 mm.

Figure 7:
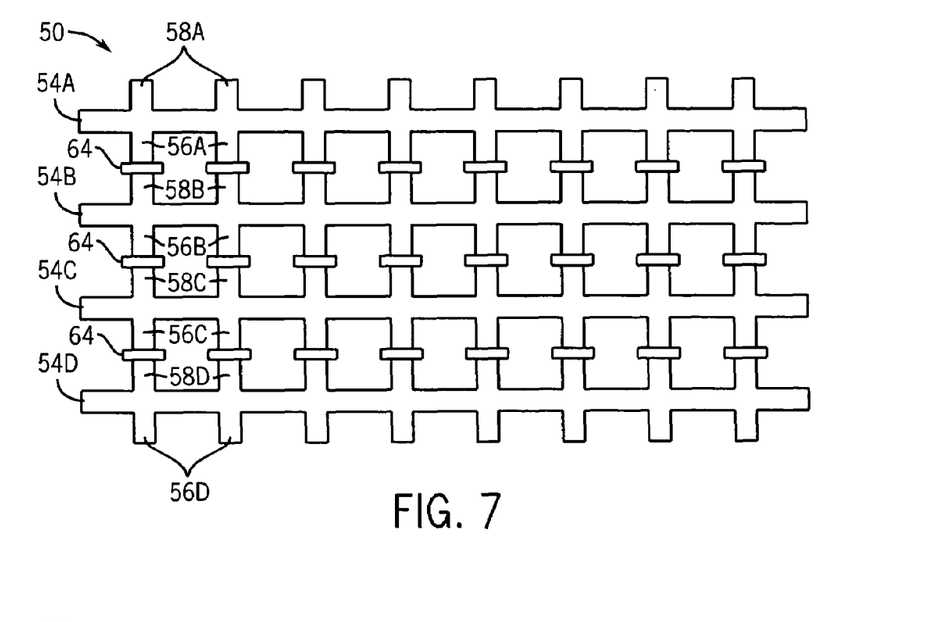
FIG. 7 is a top view of a collimator assembly employing the configuration illustrated in FIG. 5 in accordance with embodiments of the present invention.

Referring now to FIG. 7, a top view of a collimator assembly 50 employing the individual blades as illustrated in FIG. 5, is illustrated. Specifically, the collimator assembly 50 of FIG. 7 includes blades 54A-54D. Each of the blades 54A-54D has the same configuration as the blade 54 of FIG. 5. Each of the blades 54A-54D includes a plurality of fins 56A-56D, respectively, extending from a first side of the blade 54A-54D, respectively. The blades 54A-54D also include fins 58A-58D extending from a second side of the blade 54A-54D, respectively. Accordingly, the blade 54A includes fins 56A and 58A. The blade 54B includes the fins 56B and 58B, and so-forth. As illustrated in FIG. 7, each of the blades 54A-54D is arranged in parallel such that the fins of each blade 54A-54D align with the fins of any adjacent blades 54A-54D. The fins 56A-56D and 58A-58D of each of the blades 54A-54D may then be coupled to the fins 56A-56D and 58A-58D of any adjacent blade 54A-54D, as illustrated. Each of the individual blades 54A-54D may be coupled to an adjacent blade 54A-54D via an adhesive material 64. The adhesive material 64 may include glue or epoxy, for example. As will be appreciated, by coupling each of the blades 54A-54D to any adjacent blade 54A-54D, the collimator assembly 50, in accordance with embodiments of the present invention, is formed.

Figure 8:
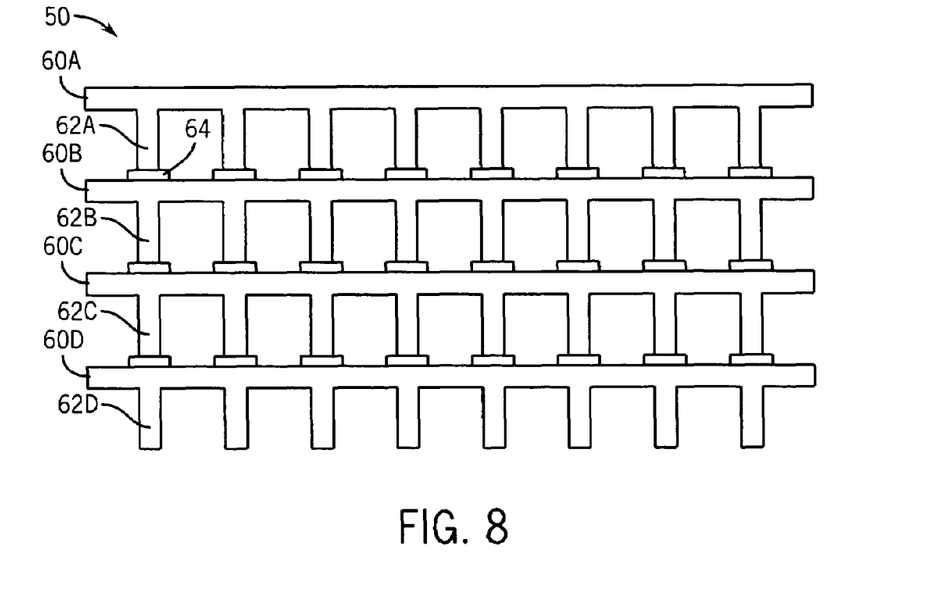
FIG. 8 is a top view of a collimator assembly employing the configuration illustrated in FIG. 6 in accordance with embodiments of the present invention.

FIG. 8 illustrates a collimator assembly 50 fabricated in accordance with embodiments of the present invention and employing the individual blades described and illustrated with reference to FIG. 6. Accordingly, the collimator assembly 50 illustrated in FIG. 8 includes blades 60A-60D. Each of the blades 60A-60D includes respective fins 62A-62D extending from only one side of the individual blades 60A-60D. As previously described, the fins 62A-62D may extend further from the body of the blade 60A-60D when compared to the embodiments illustrated with reference to FIG. 7. As further illustrated in FIG. 8, each of the fins 62A-62D is coupled directly to the lengthwise body of an adjacent blade 60A-60D, rather than the fins of an adjacent blade, as in FIG. 7. The fins 62A-62D are coupled directly to the body of the adjacent blade 60A-60D via the adhesive material 64. As will be appreciated, the overall structure of the collimator assembly 50 illustrated in FIG. 8 is essentially the same as the overall structure of the collimator assembly 50 illustrated in FIG. 7.

It should be noted that while FIGS. 7 and 8 indicate arrays formed with blades having fins, wherein the fins are coupled directly to an adjacent blade, at either the body of the blade or the fins of the blade, in certain embodiments, the fins may not actually be coupled to the adjacent blade. It may be beneficial to simply arrange the blades such that the fins align to form a grid pattern, wherein the fins are in very close proximity with the adjacent fins, but wherein the fins are not actually coupled to the adjacent blade. This embodiment may be employed in a stationary system that does not rotate and where maximizing mechanical rigidity is less of an issue, as will be appreciated.

Figure 9:
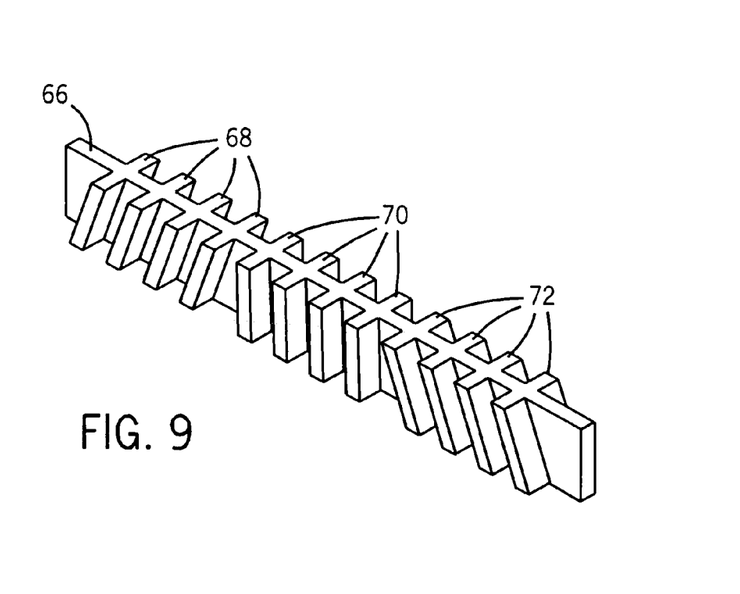
FIG. 9 is a perspective view of a collimator assembly in accordance with yet another embodiment of the present invention.

FIG. 9 illustrates yet another embodiment of a blade 66 which may be fabricated in accordance with the present invention. As previously described and illustrated with reference to FIGS. 5 and 6, the fins may extend perpendicularly from the body of the respective blade. For instance, in the blade 66 of FIG. 9, the fins 70 extend perpendicular with respect to the body of the blade 66, as previously illustrated and described with reference to FIGS. 5 and 6. However, the collimator structure that results from such an arrangement has blades and fins oriented parallel to the y-axis of the structure. Such an arrangement reduces the dose efficiency of the detector assembly because the incident x-rays are not parallel, but instead diverge from a point-like focal spot in the x-ray source. This effect becomes particularly significant as the width of the detector becomes greater in the z-direction. To achieve greater scan areas with better dose efficiency, certain of the fins may be oriented at an angle with respect to the y-axis of the blade, while remaining perpendicular to the body of the blade as illustrated in FIG. 9. In an exemplary embodiment, each fin 68 and 72 is oriented such that its axis is directed toward the focal spot of the x-ray tube. The resulting structure is said to be "focally aligned" to the source. To achieve this overall focal alignment of the fins, the fins in the center of the collimator are oriented along the y-axis and fins to either side of the center are angled inwards toward the center of the collimator. In a typical configuration the maximum angle of the outermost fin is approximately 5 degrees from the y-axis. As will be appreciated, a plurality of blades 66 may be coupled directly together to form a collimator assembly 50 whose outer blades are angled. In addition, it may be appreciated that orientations of the blades in other arrangements may be advantageous in some situations. For example, alignment of the overall structure to the focal spot may prove more robust and reliable if the fins are arranged with slightly defocused orientations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A collimator assembly comprising:
   a plurality of blades arranged in parallel with respect to one another;
   wherein each of the plurality of blades comprises a body and a respective plurality of fins coupled to the blade and extending therefrom;
   wherein each of the respective plurality of fins is coupled to an adjacent one of the plurality of blades; and
   wherein the body of each of the plurality of blades comprises a different material than the respective plurality of fins.

2. The collimator assembly, as set forth in claim 1, wherein each of the respective plurality of fins is perpendicular to the body of the blade and parallel to each other.

3. The collimator assembly, as set forth in claim 1, wherein at least a first number of each of the respective plurality of fins are arranged perpendicular to the body of the blade, and at least a second number of the plurality of blades extends at an angle of between 0 and 10 degrees from perpendicular with respect to the body.

4. The collimator assembly, as set forth in claim 1, wherein each of the respective plurality of fins extends from only one side of the blade.

5. The collimator assembly, as set forth in claim 1, wherein a first number of each of the respective plurality of fins extends from a first side of the blade and a second number of each of the respective plurality of finds extends from a second side of the blade.

6. The collimator assembly, as set forth in claim 1, wherein each of the respective plurality of fins is coupled to the respective plurality of fins on an adjacent one of the plurality of blades.

7. The collimator assembly, as set forth in claim 1, wherein each of the respective plurality of fins extends a length in the range of approximately 0.4 mm to about 1.5 mm from the blade.

8. The collimator assembly, as set forth in claim 1, wherein each of the plurality of fins comprises a polymer material loaded with a high atomic number material.

9. A collimator assembly comprising:
   a first blade having a first plurality of fins extending therefrom;
   a second blade arranged in parallel to the first blade and having a second plurality of fins extending therefrom; and
   wherein a body of each of the first and second blades comprises a different material than the respective first and second plurality of fins.

10. The collimator assembly, as set forth in claim 9, wherein the first plurality of fins is perpendicular to a body of the first blade and parallel to each other and wherein the second plurality of fins is perpendicular to a body of the second blade and parallel to each other.

11. The collimator assembly, as set forth in claim 9, wherein at least a number of the first plurality of fins extends from a body of the first blade at an angle of between 0 and 10 degrees from perpendicular with respect to the body of the first blade, and wherein at least a number of the second plurality of fins extends from a body of the second blade at an angle of between 0 and 10 degrees from perpendicular with respect to the body of the first blade.

12. The collimator assembly, as set forth in claim 9, wherein each or the first plurality or fins extends from only one side of the first blade, and wherein each of the second plurality of fins extends from only one side of the second blade.

13. The collimator assembly, as set forth in claim 9, wherein a first number of the first plurality of fins extends from a first side of the first blade and wherein a second number of the first plurality of fins extends from a second side of the first blade, and wherein a first number of the second plurality of fins extends from a first side of the second blade and wherein a second number of the second plurality of fins extends from a second side of the second blade.

14. The collimator assembly, as set forth in claim 9, wherein the first plurality of fins is coupled to the second plurality of fins.

15. The collimator assembly, as set forth in claim 9, wherein the second plurality of fins is coupled to the first blade.

16. An imaging detector assembly comprising:
a detector array;
a scintillator assembly configured to receive incident radiation and configured to convert the incident radiation to light for transmission to the detector array; and
a collimator assembly comprising:
a plurality of blades arranged in parallel with respect to one another;
wherein each of the plurality of blades comprises a respective plurality of fins coupled to the blade and extending there from;
wherein each of the respective plurality of fins is coupled to an adjacent one of the plurality of blades; and
wherein a body of each of the plurality of blades comprises a different material than the respective plurality of fins.

17. The imaging detector assembly, as set forth in claim 15, wherein each of the respective plurality of fins extends at an angle of approximately 90° with respect to the blade.

18. The imaging detector assembly, as set forth in claim 15, wherein at least a number of each of the respective plurality of fins are arranged at angles between approximately 85° and 95° relative to the length of the blade.

19. The imaging detector assembly, as set forth in claim 15, wherein each of the respective plurality of fins extends from only one side of the blade.

20. The imaging detector assembly, as set forth in claim 15, wherein a first number of each of the respective plurality of fins extends from a first side of the blade and a second number of each of the respective plurality of finds extends from a second side of the blade.

21. The imaging detector assembly, as set forth in claim 15, wherein each of the respective plurality of fins is coupled to the respective plurality of fins on an adjacent one of the plurality of blades.

22. The imaging detector assembly, as set forth in claim 15, wherein each of the respective plurality of fins extends a length in the range of approximately 0.4 mm to about 1.5 mm from the blade.

23. A method of fabricating a collimator assembly comprising:
forming a plurality of blades, wherein each of the plurality of blades comprises a respective plurality of fins extending there from;
coupling each of the respective plurality of fins to an adjacent one of the plurality of blade; and
wherein a body of each of the plurality of blades comprises a different material than the respective plurality of fins.

24. The method, as set forth in claim 23, wherein forming each of the plurality of blades comprises forming a blade having fins extending from only one side of the blade.

25. The method, as set forth in claim 23, wherein forming each of the plurality of blades comprises forming a blade having fins extending from each side of the blade.

26. The method, as set forth in claim 23, wherein forming each of the plurality of blades comprises coupling the respective plurality of fins to the blade.

27. The method, as set forth in claim 23, wherein coupling each of the respective plurality of fins to an adjacent one of the plurality of blades comprises coupling each of the respective fins of the associated one of the plurality of blades to the respective fins of an adjacent one of the respective plurality of blades.

* * * * *